(12) United States Patent
Koyama et al.

(10) Patent No.: US 8,416,220 B2
(45) Date of Patent: Apr. 9, 2013

(54) SEMICONDUCTOR DEVICE

(75) Inventors: Jun Koyama, Sagamihara (JP); Takeshi Osada, Atsugi (JP); Takanori Matsuzaki, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1116 days.

(21) Appl. No.: 11/730,086

(22) Filed: Mar. 29, 2007

(65) Prior Publication Data

US 2007/0188214 A1  Aug. 16, 2007

Related U.S. Application Data

(62) Division of application No. 10/917,374, filed on Aug. 13, 2004, now Pat. No. 7,199,637.

(30) Foreign Application Priority Data

Sep. 2, 2003  (JP) ................................. 2003-310767

(51) Int. Cl.
*G06F 3/038* (2006.01)
*G09G 5/00* (2006.01)

(52) U.S. Cl. ........................................ 345/204; 327/330

(58) Field of Classification Search .................. 438/14, 438/17–18, 22–24, 34, 57; 345/30, 53–54, 345/87, 92, 94, 98, 204–205, 208, 211, 214; 381/111; 327/560–586
See application file for complete search history.

(56) References Cited

U.S. PATENT DOCUMENTS

| | | | |
|---|---|---|---|
| 4,462,050 A * | 7/1984 | Cox | 360/32 |
| 4,529,973 A * | 7/1985 | Blamberg | 340/573.1 |
| 4,560,890 A | 12/1985 | Masuda et al. | |
| 4,914,375 A * | 4/1990 | Hatanaka | 323/206 |
| 5,136,649 A * | 8/1992 | Ishikawa | 381/22 |
| 5,579,214 A * | 11/1996 | Kitani et al. | 363/44 |
| 6,211,730 B1 * | 4/2001 | Fujimoto | 330/51 |
| 6,687,380 B1 * | 2/2004 | Vishwamitra | 381/386 |
| 6,850,080 B2 | 2/2005 | Hiroki | |
| 6,890,842 B2 | 5/2005 | Sandhu et al. | |

(Continued)

FOREIGN PATENT DOCUMENTS

| | | |
|---|---|---|
| JP | 61-151880 A | 7/1986 |
| JP | 01-300606 A | 12/1989 |

(Continued)

OTHER PUBLICATIONS

Michio Okamura, "Fig. 11-16 an ideal diode(half-wave rectifier)circuit,", Standard Text OP-Amp Circuit Design, Sep. 10, 1990, p. 316, CQ Publishing Co., Ltd.

*Primary Examiner* — Alexander Eisen
*Assistant Examiner* — Patrick F Marinelli
(74) *Attorney, Agent, or Firm* — Eric J. Robinson; Robinson Intellectual Property Law Office, P.C.

(57) ABSTRACT

A rectifier circuit configured with a conventional configuration using an operational amplifier and a diode by a thin film transistor over an insulating substrate cannot exhibit the performance of a rectifier circuit due to the low stability of operational amplifier and the low high-frequency characteristic. Therefore, the rectifier circuit requires to be configured by using an IC outside of the insulating substrate in order to rectify a high-frequency signal. According to the invention, an amplifier circuit and a waveform shaping circuit are configured with a thin film transistor and a non-rectified signal is switched by a signal thereof, so that a rectifier circuit with the excellent high-frequency characteristic can be realized.

17 Claims, 10 Drawing Sheets

U.S. PATENT DOCUMENTS

| | | |
|---|---|---|
| 6,891,391 B2 | 5/2005 | Hiroki |
| 6,891,578 B2 * | 5/2005 | Yonehara et al. ............... 349/43 |
| 7,105,365 B2 | 9/2006 | Hiroki et al. |
| 7,199,637 B2 | 4/2007 | Koyama et al. |
| 7,522,159 B2 * | 4/2009 | Miyata et al. ................. 345/204 |
| 2002/0132383 A1 * | 9/2002 | Hiroki et al. .................... 438/17 |
| 2002/0149056 A1 * | 10/2002 | Ohtani et al. ................. 257/350 |
| 2003/0189542 A1 * | 10/2003 | Lee et al. ......................... 345/93 |
| 2004/0201056 A1 * | 10/2004 | Miyata et al. ................. 257/303 |
| 2005/0030270 A1 | 2/2005 | Miyata et al. |

FOREIGN PATENT DOCUMENTS

| | | |
|---|---|---|
| JP | 01-311464 A | 12/1989 |
| JP | 04-021361 A | 1/1992 |
| JP | 04-042474 A | 2/1992 |
| JP | 04-097908 A | 8/1992 |
| JP | 07-194126 A | 7/1995 |
| JP | 08-180259 A | 7/1996 |
| JP | 2000-020010 A | 1/2000 |
| JP | 3093355 | 5/2003 |

* cited by examiner

SEMICONDUCTOR DEVICE

BACKGROUND OF THE INVENTION

1. Field of the Invention

The present invention relates to a semiconductor device, and in particular, relates to a semiconductor device having a rectifier circuit configured with a thin film semiconductor element. The invention also relates to an electronic apparatus using a semiconductor device having a rectifier circuit.

2. Description of the Related Art

In recent years, mobile phones have been widely used with the advance of communication technology. In future, transmissions of moving images and of more information are expected. In addition, through reduction in weight of personal computers, those adapted for mobile communication have been produced. Information terminals called PDAs originated in electronic notebooks have been also produced in large quantities and widely used. With the development of display devices, the majority of portable information devices are equipped with a flat panel display.

In particular, a display device having both a pixel and a driver configured with a thin film transistor by using a technology called a low-temperature polysilicon for forming polysilicon over a glass by laser annealing has been widely used recently. In addition, circuits using the low-temperature polysilicon technology have been developed, and a CPU, a memory circuit, and the like using the technology are released. The application of the low-temperature polysilicon technology to an analog circuit may be realized sooner or later.

By such an analog circuit, nonelectrical data from outside of a display device such as a sound and a pressure can be detected. A sound signal is converted into an electrical signal by a microphone and the electrical signal is amplified, and then converted into direct current by a rectifier circuit or a smoothing circuit. The nonelectrical data can be detected based on the direct current potential.

In the case where the rectifier circuit can be configured with a thin film transistor over an insulating substrate, a display device using low-temperature polysilicon can be configured more systematically.

A rectifier circuit is generally configured by a diode and an operational amplifier as shown in FIG. 3. Such rectifier circuit is well known and frequently employed due to its simple configuration in the case of structuring an electronic apparatus (see Non-Patent Document 1, for example).

[Non-Patent Document 1]

'Standard Text for OP-Amp Circuit Design', CQ publisher, p. 316

An operation of a circuit shown in FIG. 3 is explained hereinafter. Considered first is the case where a signal with a potential higher than that of a power source 309 is inputted to an input terminal 307. A potential of an inverting input terminal of an operational amplifier 301 is equal to that of a non-inverting input terminal and the non-inverting input terminal is connected to the power source 309, therefore, the potential of the non-inverting input terminal is equal to that of the power source 309. Accordingly, current flows from the input terminal 307 toward the inverting input terminal. The current flows into an output terminal of the operational amplifier 301 through a diode 303. An output potential of the operational amplifier 301 becomes lower than the potential of the power source 309 by one VF of the diode 303. Each potential at both ends of a resistor 305 is equal to that of the power source 309 because no current flows into the resistor 305 in this case.

Considered next is the case where a signal with a potential lower than that of the power source 309 is inputted to the input terminal 307. Current flows from the output terminal of the operational amplifier 301 into the input terminal 307 through a diode 302, the resistor 305, and a resistor 304 in this case. A signal of the opposite phase to the input signal is outputted to a connection point between the resistor 305 and the diode 302. FIG. 4A shows an input signal and FIG. 4B shows an output after the rectification. It is noted that the reference numeral 306 refers to a smoothing circuit and 308 refers to an output terminal.

SUMMARY OF THE INVENTION

The conventional rectifier circuit described above has the following problem when being configured with a thin film transistor and mounted over an insulating substrate.

The conventional rectifier circuit basically includes an operational amplifier, and thus the alternating-current feedback is required in using the circuit. In the case of a thin film transistor, the current capability of each element is small, and thus a large element is required for improving the current capability. However, increase in the size of an element causes increase in the parasitic capacitance and the oscillation stability becomes worse, consequently, the alternating-current feedback cannot be performed.

Therefore, in the case of configuring the conventional rectifier circuit with the conventional thin film transistor, many capacitors for preventing the oscillation are required to connect in the rectifier circuit in order to solve the problem of the oscillation. That reduces a frequency characteristic and a rectified waveform shown in FIG. 4C is obtained, which is not a desirable waveform.

In view of the above problem, a rectifier circuit having an amplifying function, a waveform shaping function for shaping waveform of an amplified signal, and a switching function which can be controlled by the waveform shaped signal is provided, aiming to realize a semiconductor device mounting a rectifier circuit by a thin film element.

According to the invention, in a semiconductor device having a rectifier circuit configured with a thin film transistor over an insulating substrate, the rectifier circuit comprises an amplifier circuit, a waveform shaping circuit for shaping waveform of an outputted signal of the amplifier circuit, and a switching circuit which is controlled by an outputted signal of the waveform shaping circuit.

According to the invention, in a semiconductor device having a rectifier circuit configured with a thin film transistor over an insulating substrate, the rectifier circuit comprises an amplifier circuit, a waveform shaping circuit for shaping waveform of an outputted signal of the amplifier circuit, a switching circuit which is controlled by an outputted signal of the waveform shaping circuit, and a resistor which is connected to the switching circuit.

According to the invention, in a semiconductor device having a rectifier circuit configured with a thin film transistor over an insulating substrate, the rectifier circuit comprises an input terminal, a power source, an amplifier circuit, a waveform shaping circuit for shaping waveform of an outputted signal of the amplifier circuit, a switching circuit which is controlled by an outputted signal of the waveform shaping circuit, and a buffer amplifier, the power source is connected to a first terminal of the switching circuit, and the input terminal is connected to a second terminal of the switching circuit and the amplifier circuit.

According to the invention, in a semiconductor device having a rectifier circuit configured with a thin film transistor over an insulating substrate, the rectifier circuit comprises a first input terminal, a second input terminal, an amplifier circuit, a waveform shaping circuit for shaping waveform of an outputted signal of the amplifier circuit, a switching circuit which is controlled by an outputted signal of the waveform shaping circuit, and a buffer amplifier, the first input terminal is connected to a first terminal of the switching circuit and a first input terminal of the amplifier circuit, and the second input terminal is connected to a second terminal of the switching circuit and a second input terminal of the amplifier circuit.

In the abovementioned configuration according to the invention, the switching circuit is an analog switching circuit.

In the abovementioned configuration according to the invention, the analog switching circuit is configured by an n-type thin film transistor and a p-type thin film transistor, and further the respective gate width of the n-type thin film transistor and the p-type thin film transistor is approximately equal to each other.

In the abovementioned configuration according to the invention, the waveform shaping circuit is an inverter circuit.

The invention provides an electronic apparatus including the abovementioned semiconductor device.

As described above, in the semiconductor device according to the invention, a rectifier circuit with a preferable frequency characteristic can be realized by using a thin film transistor over an insulating substrate so as to amplify an input signal and shape waveform of the signal to control the switching of an input signal.

DETAILED DESCRIPTION OF THE INVENTION

Hereinafter, embodiment modes of the invention are described in detail with reference to the accompanying drawings.

Embodiment Mode 1

Figure 1:
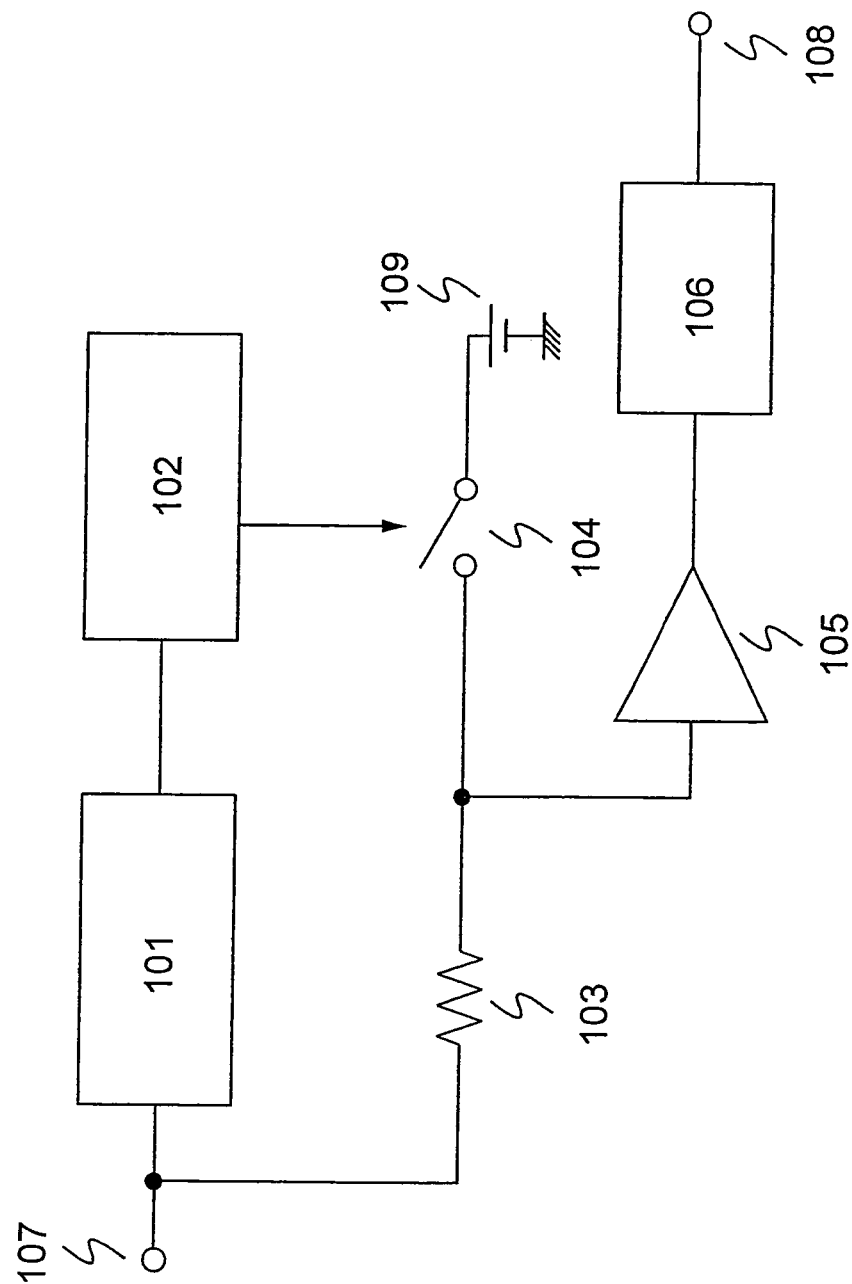
FIG. 1 is a diagram showing an embodiment mode of the rectifier circuit in the semiconductor device of the invention.

FIG. 1 shows a first embodiment mode of the invention. The embodiment mode shown in FIG. 1 comprises an amplifier circuit 101, a waveform shaping circuit 102, a resistor 103, a switch 104, a buffer amplifier 105, a smoothing circuit 106, an input terminal 107, and an output terminal 108. This circuit is configured with a thin film transistor (abbreviated to a TFT hereinafter). An operation of this embodiment mode is explained below.

In the beginning, a signal inputted to the input terminal 107 is amplified by the amplifier circuit 101. An output of the amplifier circuit 101 is inputted to the waveform shaping circuit 102, and thereby, waveform is shaped into a logic signal. The waveform shaped signal is inputted to the switch 104 as a control signal so as to turn ON/OFF the switch 104. The signal inputted to the input terminal 107 is also inputted to the resistor 103 as well as the amplifier circuit 101.

When the switch 104 is OFF, the signal is inputted to the buffer amplifier 105 through the resistor 103. An input impedance of the buffer amplifier 105 is preferably set much higher than a resistance value of the resistor 103 for reducing loss due to the resistor 103, so that the inputted signal is inputted to the smoothing circuit 106 through the buffer amplifier 105.

Figure 4A:
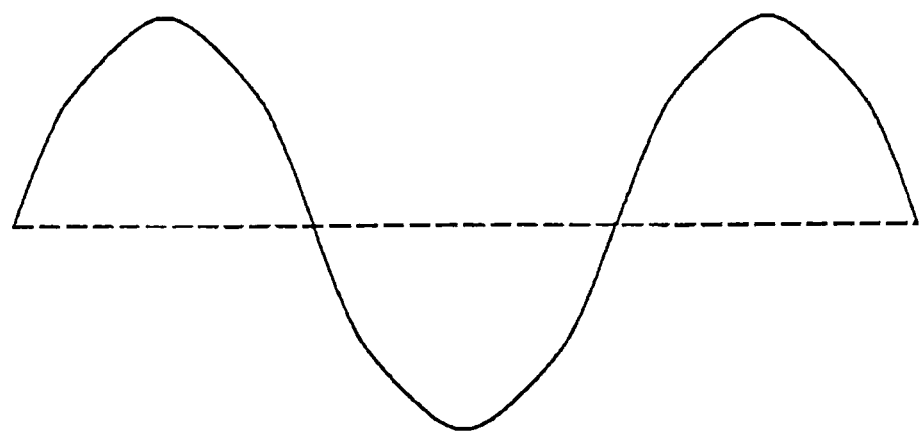
FIGS. 4A to 4C are diagrams showing waveforms of the rectifier circuit.
Figure 4B:
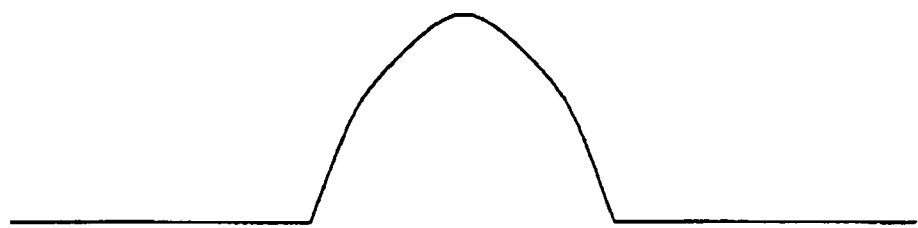
Figure 4C:
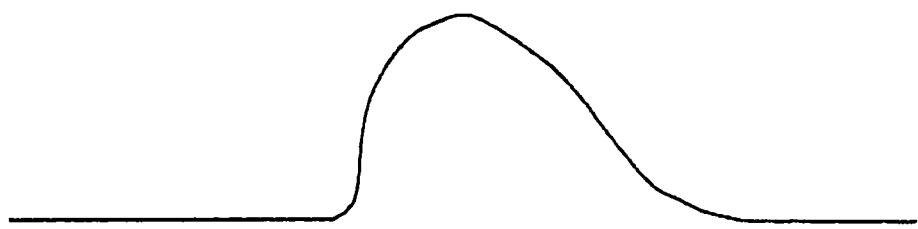

When the switch 104 is ON, an input of the buffer amplifier 105 is connected to a power source 109, and thus only a direct current potential is outputted from the buffer amplifier 105. That waveform corresponds to FIG. 4B. The rectified waveform is smoothed by the smoothing circuit 106, then outputted to the output terminal 108.

In this manner, according to this embodiment mode, a rectifier circuit is configured with an amplifier circuit to which a feedback is not performed, a waveform shaping circuit, a resistor, and a switch to configure over an insulating substrate by using a TFT without deteriorating a frequency characteristic thereof.

Accordingly, a semiconductor device such that a display portion and a rectifier circuit are integrally formed over an insulating substrate can be obtained.

Embodiment Mode 2

Figure 2:
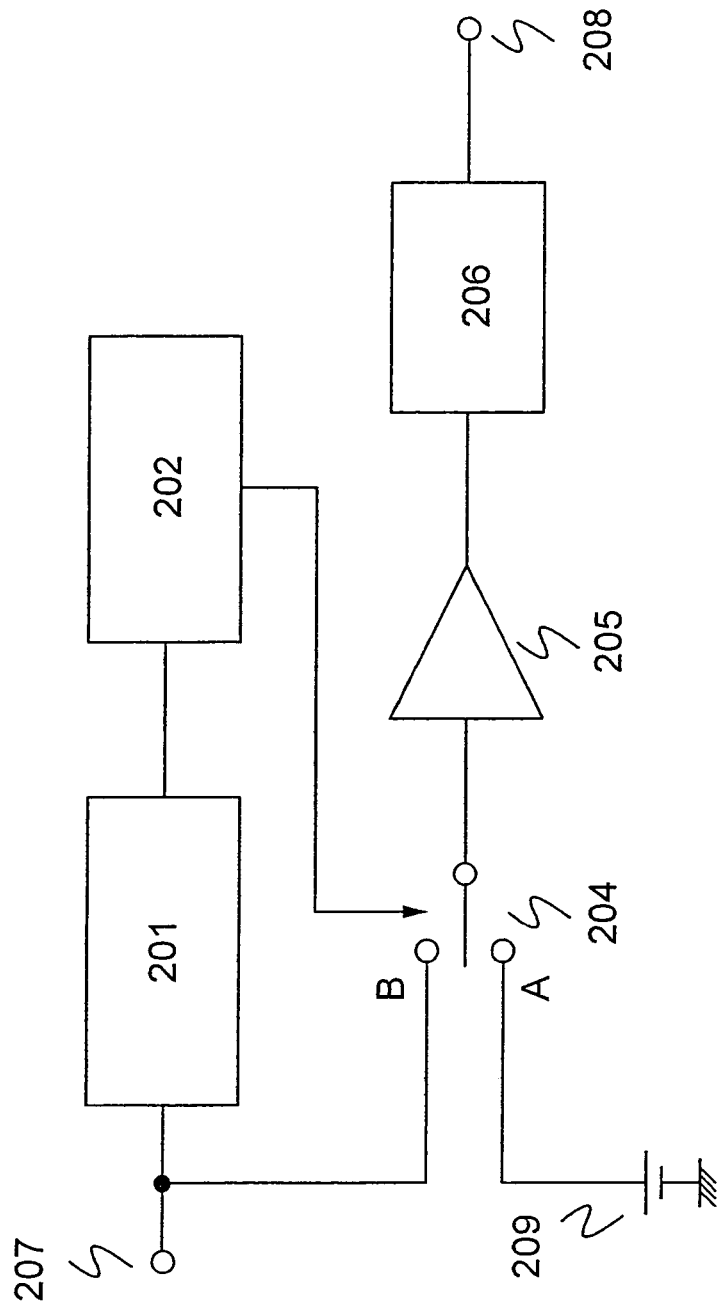
FIG. 2 is a diagram showing an embodiment mode of the rectifier circuit in the semiconductor device of the invention.
Figure 3:
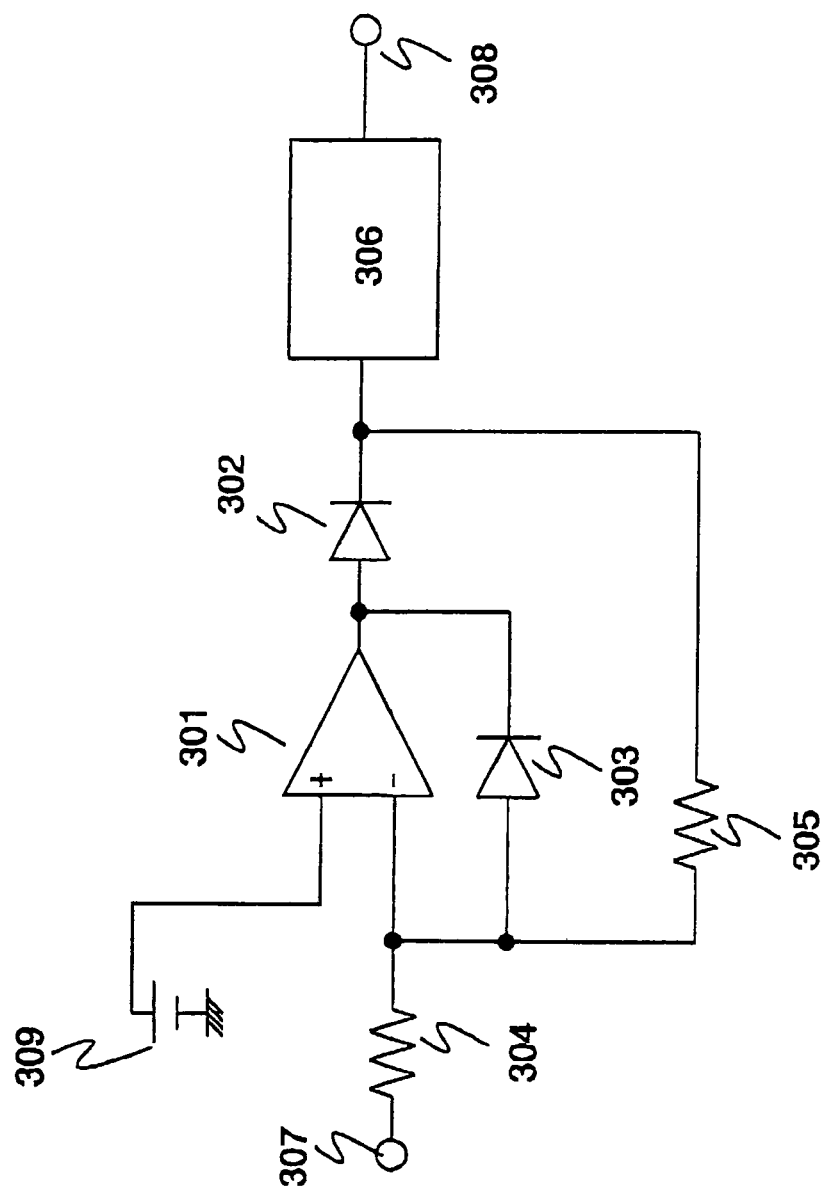
FIG. 3 is a diagram showing an example of the rectifier circuit in the conventional semiconductor device.

FIG. 2 shows a second embodiment mode of the invention. The embodiment mode shown in FIG. 2 comprises an amplifier circuit 201, a waveform shaping circuit 202, a switch 204, a buffer amplifier 205, a smoothing circuit 206, an input terminal 207, and an output terminal 208. An operation of this embodiment mode is explained below.

In the beginning, a signal inputted to the input terminal 207 is amplified by the amplifier circuit 201. An output of the amplifier circuit 201 is inputted to the waveform shaping circuit 202, and thereby, waveform is shaped into a logic signal. The waveform shaped signal is inputted to the switch 204 as a control signal so as to switch the connection of the switch 204. The signal inputted to the input terminal 207 is also inputted to the switch 204 as well as the amplifier circuit 201.

When the switch 204 is connected to 'B', the inputted signal is inputted to the buffer amplifier 205 and the smoothing circuit 206 in this order.

When the switch 204 is connected to 'A', an input of the buffer amplifier 205 is connected to a power source 209, and thus only a direct current potential is outputted from the buffer amplifier 205. That waveform corresponds to FIG. 4B. The rectified waveform is smoothed by the smoothing circuit 206, then outputted to the output terminal 208.

In this manner, according to this embodiment mode, a rectifier circuit is configured with an amplifier circuit to which a feedback is not performed, a waveform shaping circuit, and a switch to configure over an insulating substrate by using a TFT without deteriorating a frequency characteristic thereof.

Accordingly, a semiconductor device such that a display portion and a rectifier circuit are integrally formed over an insulating substrate can be obtained.

Embodiment 1

Figure 5:
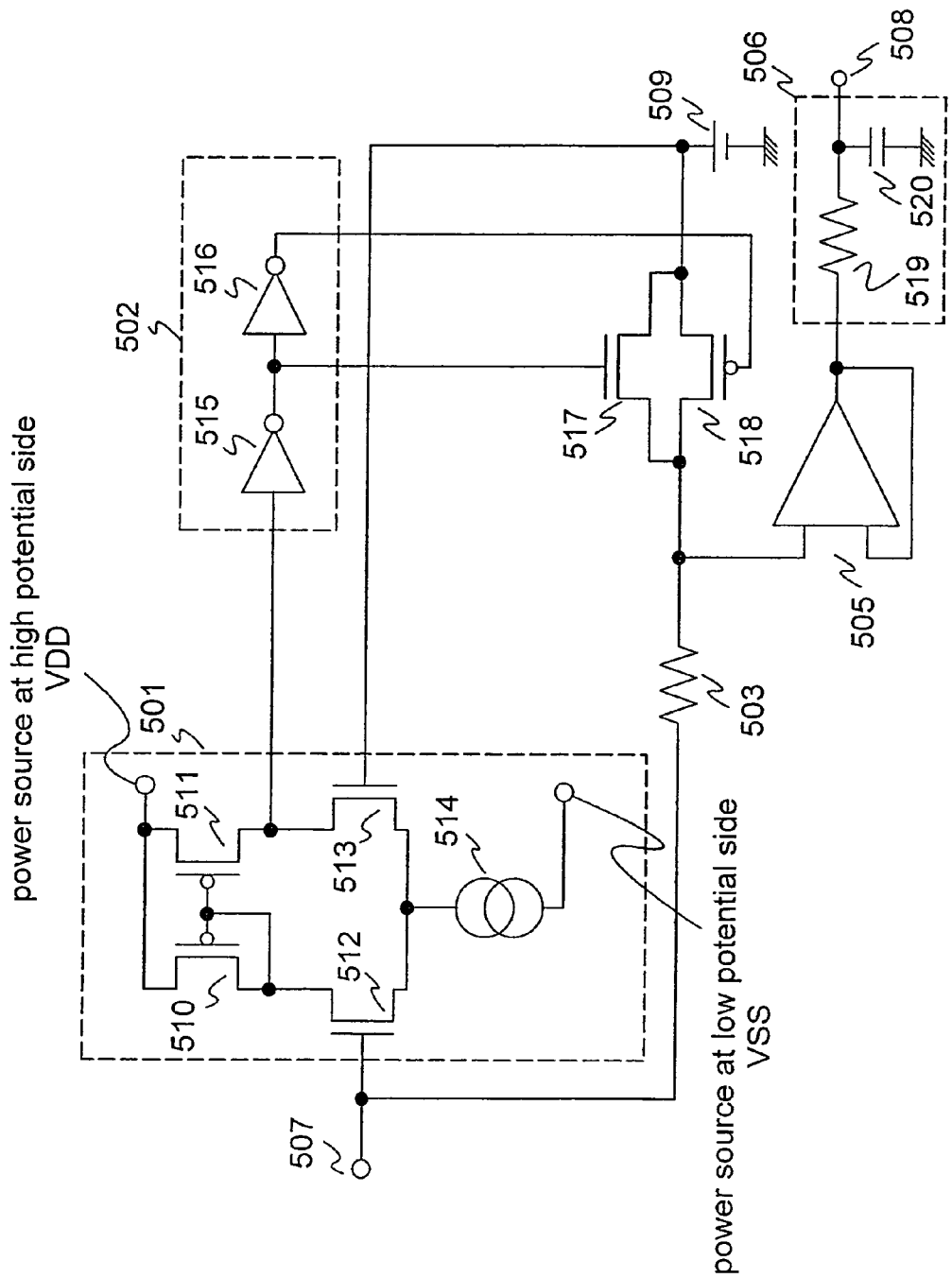
FIG. 5 is a diagram showing an embodiment of the rectifier circuit in the semiconductor device of the invention.

FIG. 5 shows a first embodiment of the invention and shows the first embodiment mode shown in FIG. 1 in more detail. The embodiment mode shown in FIG. 5 comprises an amplifier circuit 501, a waveform shaping circuit 502, a resistor 503, analog switching TFTs 517 and 518, a buffer amplifier 505, a smoothing circuit 506, an input terminal 507, and an output terminal 508. Further, the amplifier circuit 501 comprises TFTs 510 to 513 and a current source 514, the waveform shaping circuit 502 comprises inverters 515 and 516, and the smoothing circuit 506 comprises a resistor 519 and a capacitor 520. An operation of this embodiment is explained below.

A signal inputted to the input terminal 507 is amplified by the amplifier circuit 501. The amplifier circuit 501 comprises a differential circuit configured by the TFTs 512 and 513 and a current mirror circuit configured by the TFTs 510 and 511. When a signal with a potential higher than that of a power source 509 is inputted to the input terminal 507, the amount of current in the TFTs 512, 510, and 511 becomes larger than that in the TFT 513. Consequently, Hi is outputted from the amplifier circuit 501. When a signal with a potential lower than that of the power source 509 is inputted to the input terminal 507, the amount of current in the TFTs 512, 510, and 511 becomes smaller than that in the TFT 513. Consequently, Lo is outputted from the amplifier circuit 501.

The output of the amplifier circuit 501 is inputted to the waveform shaping circuit 502, and thereby, waveform is shaped into a logic signal. The waveform shaping circuit 502 is configured with an inverter in this embodiment. The waveform shaped signal is inputted to the analog switching TFTs 517 and 518 as a control signal so as to turn ON/OFF the analog switching TFTs 517 and 518.

When the output of the amplifier circuit 501 is Hi, the analog switching TFTs 517 and 518 are turned OFF. When the output of the amplifier circuit 501 is Lo, the analog switching TFTs 517 and 518 are turned ON. The signal inputted to the input terminal 507 is also inputted to the resistor 503 as well as the amplifier circuit 501.

When the analog switching TFTs 517 and 518 are OFF, the signal is inputted to the buffer amplifier 505 through the resistor 503. An input impedance of the buffer amplifier 505 is preferably set much higher than a resistance value of the resistor 503 for reducing loss due to the resistor 503, so that the inputted signal is inputted to the smoothing circuit 506 through the buffer amplifier 505.

When the analog switching TFTs 517 and 518 are ON, an input of the buffer amplifier 505 is connected to the power source 509, and thus only a direct current potential is outputted from the buffer amplifier 505. That waveform corresponds to FIG. 4B. The rectified waveform is smoothed by the smoothing circuit 506 configured by the resistor 519 and the capacitor 520, then outputted to the output terminal 508.

It is preferable that the respective gate width of the p-type TFT 518 and the n-type TFT 517 is approximately equal to each other in order to prevent the influence of the gate capacitance of the switching TFTs upon the control signal.

In this manner, according to this embodiment mode, a rectifier circuit is configured with an amplifier circuit to which a feedback is not performed, a waveform shaping circuit, a resister, and a switch to configure over an insulating substrate by using a TFT without deteriorating a frequency characteristic thereof.

Accordingly, a semiconductor device such that a display portion and a rectifier circuit are integrally formed over an insulating substrate can be obtained.

Figure 10:
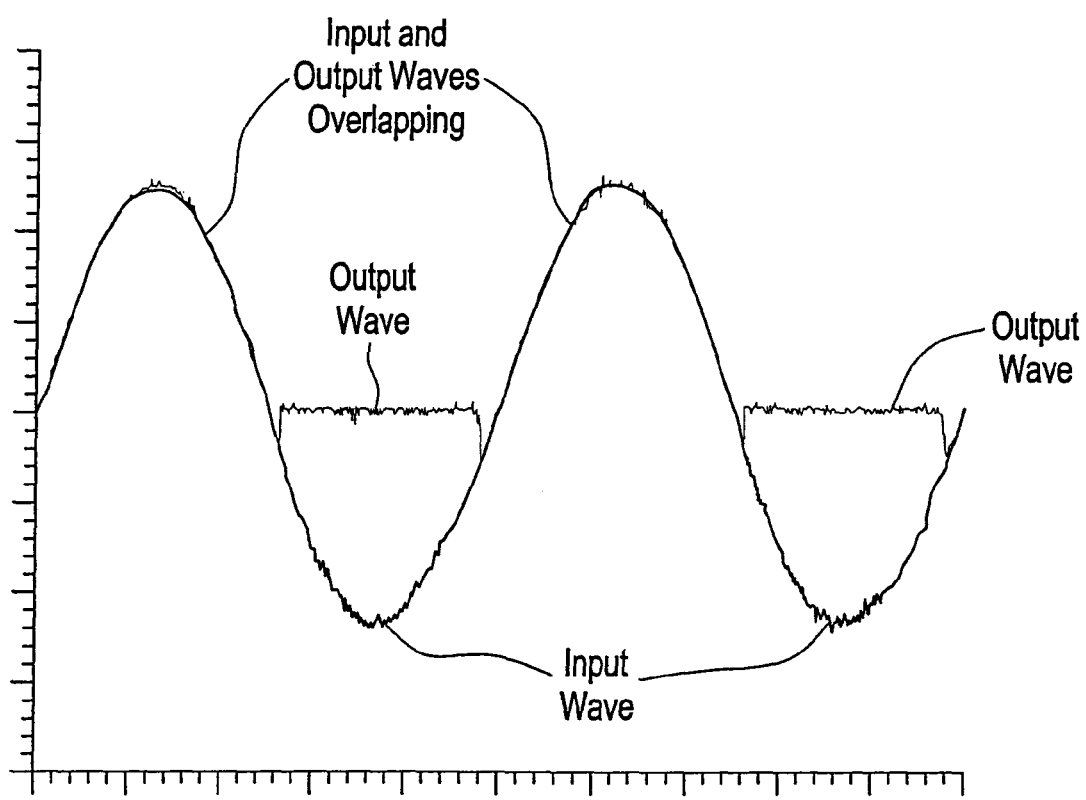
FIG. 10 is a diagram showing the waveform of the rectifier circuit which is measured in Embodiment 1.

FIG. 10 shows an inputted sine wave and an output wave after the half-wave rectification, which are inputted for verifying the operation of the circuit explained in the first embodiment shown in FIG. 5. The input wave is a signal of sine wave of 1 kHz and 1 Vpp that is inputted to the input terminal 507, whereas the output wave is a signal that is outputted from the output terminal 508.

The output wave becomes a constant potential during every second half cycle of the sine wave. That is, during the sine wave is in one half cycle at the positive side, the same waveform as the sine wave is outputted while during the sine wave is in the other half cycle at the negative side, a constant potential is outputted.

A rectifier circuit with a preferable frequency characteristic is realized without dulling an output waveform in this manner, that ensures the effect of the invention.

Embodiment 2

Figure 6:
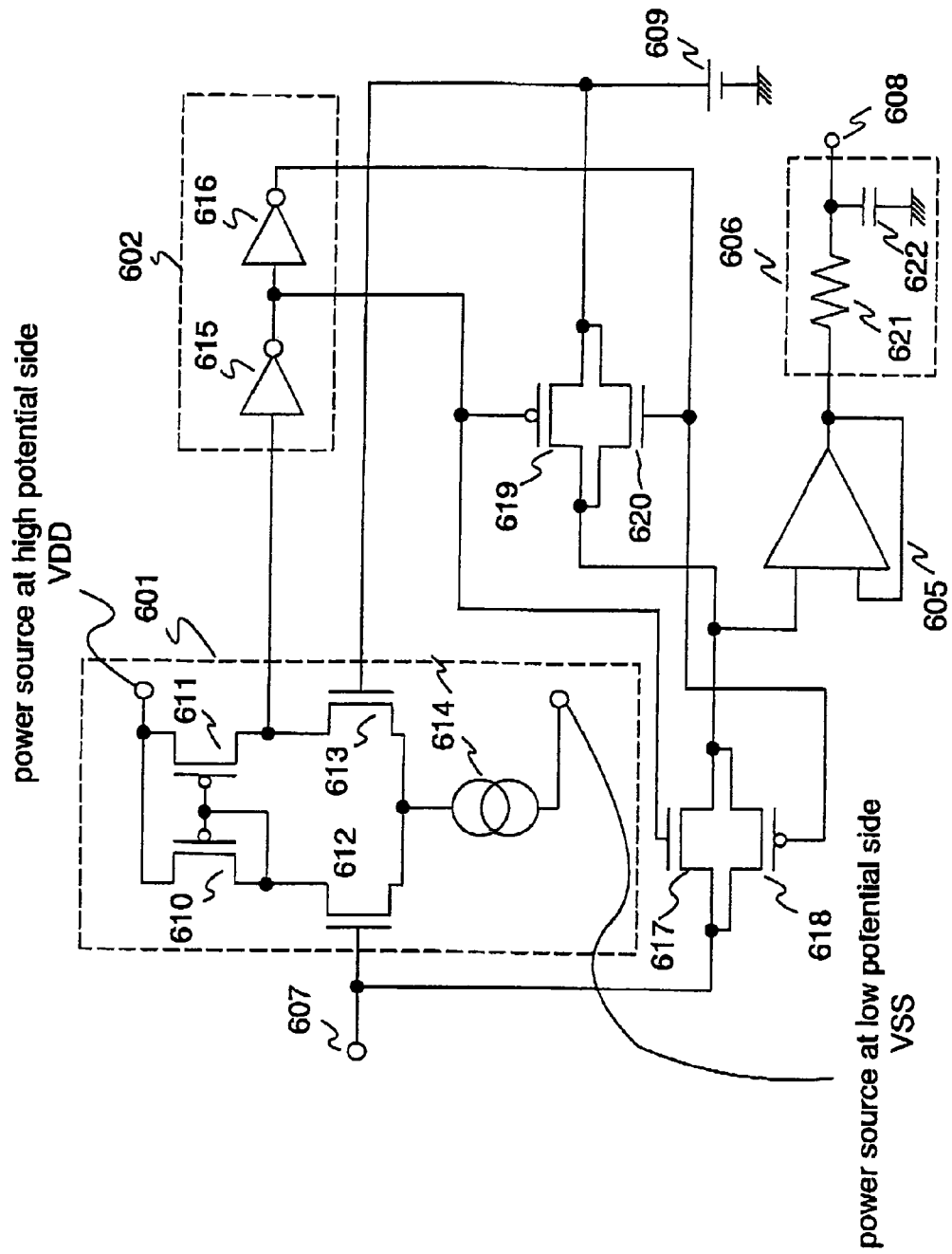
FIG. 6 is a diagram showing an embodiment of the rectifier circuit in the semiconductor device of the invention.

FIG. 6 shows a second embodiment of the invention and shows the second embodiment mode shown in FIG. 2 in more detail. The embodiment mode shown in FIG. 6 comprises an amplifier circuit 601, a waveform shaping circuit 602, analog switching TFTs 617 to 620, a buffer amplifier 605, a smoothing circuit 606, an input terminal 607, and an output terminal 608. Further, the amplifier circuit 601 comprises TFTs 610 to 613 and a current source 614, the waveform shaping circuit 602 comprises inverters 615 and 616, and the smoothing circuit 606 comprises a resistor 621 and a capacitor 622. An operation of this embodiment is explained below.

A signal inputted to the input terminal 607 is amplified by the amplifier circuit 601. The amplifier circuit 601 comprises a differential circuit configured by the TFTs 612 and 613 and a current mirror circuit configured by the TFTs 610 and 611. When a signal with a potential higher than that of a power source 609 is inputted to the input terminal 607, the amount of current in the TFTs 612, 610, and 611 becomes larger than that in the TFT 613. Consequently, Hi is outputted from the amplifier circuit 601. When a signal with a potential lower than that of the power source 609 is inputted to the input terminal 607, the amount of current in the TFTs 612, 610, and 611 becomes smaller than that in the TFT 613. Consequently, Lo is outputted from the amplifier circuit 601.

The output of the amplifier circuit 601 is inputted to the waveform shaping circuit 602, and thereby, waveform is shaped into a logic signal. The waveform shaping circuit 602 is configured with an inverter in this embodiment. The waveform shaped signal is inputted to the analog switching TFTs 617 to 620 as a control signal so as to turn ON/OFF the analog switching TFTs 617 and 620.

When the output of the amplifier circuit 601 is Hi, the analog switching TFTs 617 and 618 are turned OFF while TFTs 619 and 620 are turned ON. When the output of the amplifier circuit 601 is Lo, the analog switching TFTs 617 and 618 are turned ON while TFTs 619 and 620 are turned OFF. The signal inputted to the input terminal 607 is also inputted to the analog switching TFTs 617 and 618 as well as the amplifier circuit 601.

When the analog switching TFTs 617 and 618 are ON while TFTs 619 and 620 are OFF, the signal is inputted to the buffer amplifier 605 and the smoothing circuit 606 in this order. When the analog switching TFTs 617 and 618 are OFF while TFTs 619 and 620 are ON, an input of the buffer amplifier 605 is connected to the power source 609, and thus only a direct current potential is outputted from the buffer amplifier 605. That waveform corresponds to FIG. 4B. The rectified waveform is smoothed by the smoothing circuit 606 configured by the resistor 621 and the capacitor 622, then outputted to the output terminal 608.

It is preferable that the respective gate width of the p-type TFTs 618 and 619 and the n-type TFTs 617 and 620 of analog switching circuits is approximately equal to one another in order to prevent the influence of the gate capacitance of the switching TFTs upon the control signal.

In this manner, according to this embodiment mode, a rectifier circuit is configured with an amplifier circuit to which a feedback is not performed, a waveform shaping circuit, a resister, and a switch to configure over an insulating substrate by using a TFT without deteriorating a frequency characteristic thereof.

Accordingly, a semiconductor device such that a display portion and a rectifier circuit are integrally formed over an insulating substrate can be obtained.

Embodiment 3

Figure 8:
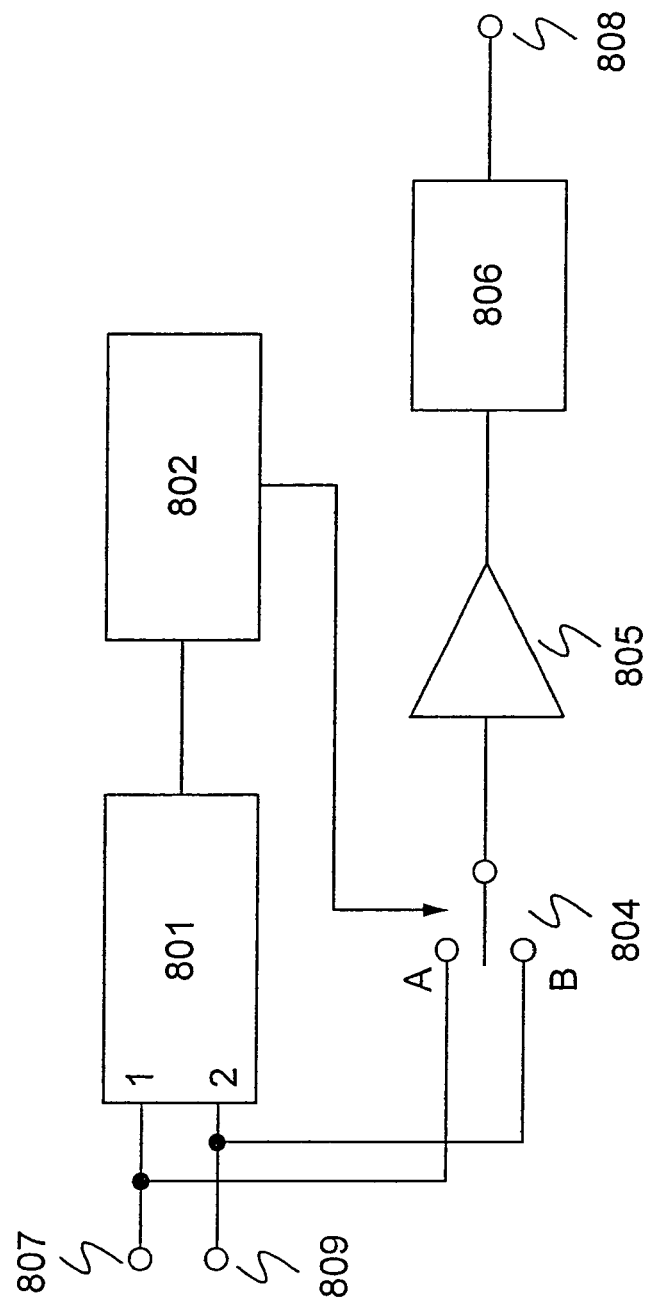
FIG. 8 is a diagram showing an embodiment of the rectifier circuit in the semiconductor device of the invention.

FIG. 8 shows a third embodiment mode of the invention and shows an embodiment of a full-wave rectifier circuit. The embodiment mode shown in FIG. 8 comprises an amplifier circuit 801, a waveform shaping circuit 802, a switch 804, a buffer amplifier 805, a smoothing circuit 806, input terminals 807 and 809, and an output terminal 808. An operation of this embodiment mode is explained below.

Signals of opposite phases to each other are inputted to the input terminals 807 and 809, then amplified by the amplifier circuit 801. The amplifier circuit 801 is an amplifier circuit of differential input type. An output of the amplifier circuit 801 is inputted to the waveform shaping circuit 802, and thereby, waveform is shaped into a logic signal. The waveform shaped signal is inputted to the switch 804 as a control signal so as to switch the connection of the switch 804. The signals inputted to the input terminals 807 and 809 are also inputted to the switch 804 as well as the amplifier circuit 801.

When the switch 804 is connected to 'A', the inputted signal of the input terminal 807 is inputted to the buffer amplifier 805 and the smoothing circuit 806 in this order.

When the switch 804 is connected to 'B', the inputted signal of the input terminal 809 is inputted to the buffer amplifier 805 and the smoothing circuit 806 in this order. The full-wave rectified waveform is smoothed by the smoothing circuit 806, then outputted to the output terminal 808.

In this manner, according to this embodiment mode, a rectifier circuit is configured with an amplifier circuit to which a feedback is not performed, a waveform shaping circuit, and a switch to configure over an insulating substrate by using a TFT without deteriorating a frequency characteristic thereof.

Accordingly, a semiconductor device such that a display portion and a rectifier circuit are integrally formed over an insulating substrate can be obtained.

Embodiment 4

Figure 9:
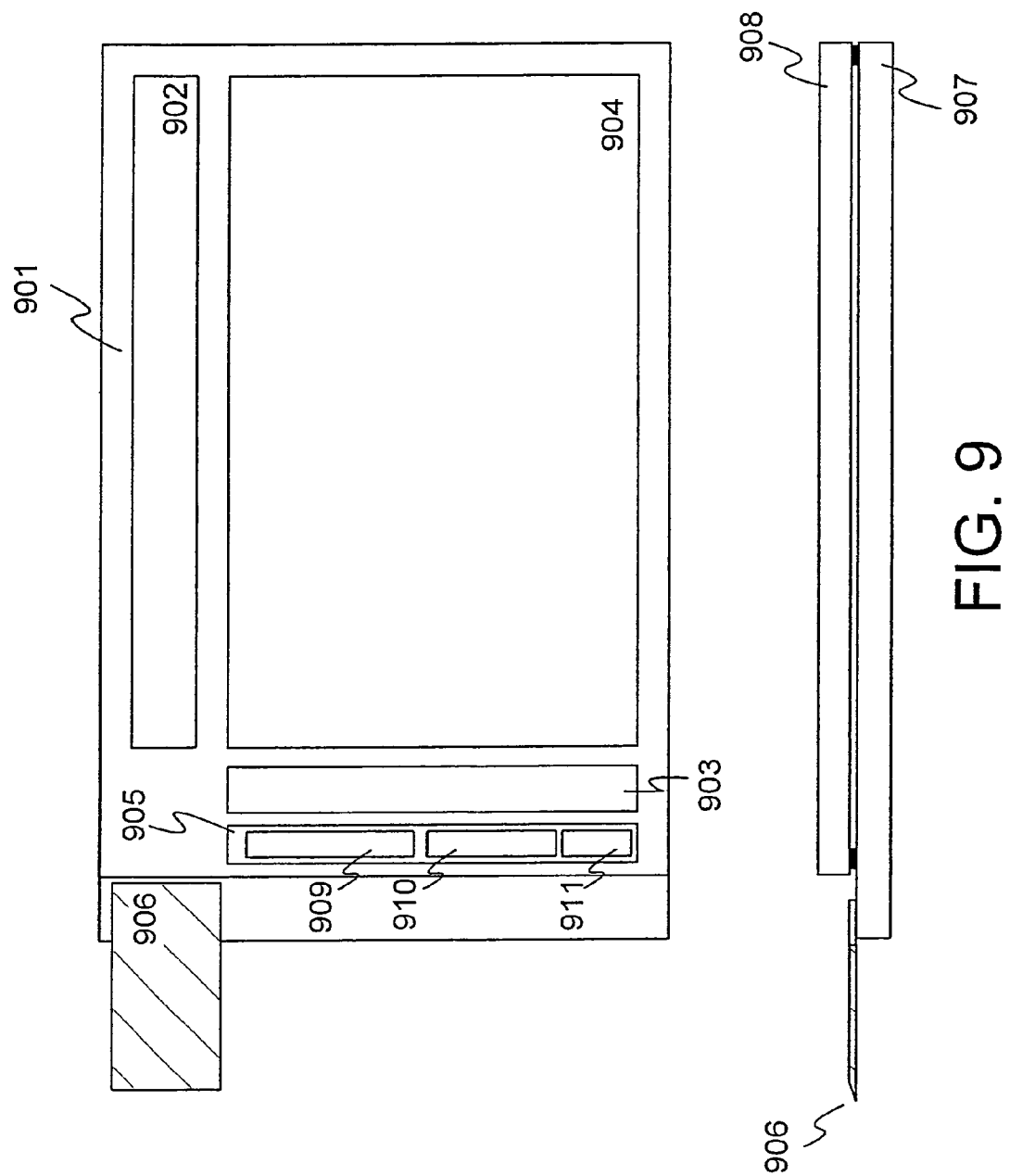
FIG. 9 is a view showing an embodiment of the semiconductor device of the invention.

FIG. 9 shows a semiconductor device 901 having a liquid crystal display portion. The semiconductor device 901 comprises a TFT substrate 907, a counter substrate 908, a source signal line driver circuit 902, a gate signal line driver circuit 903, a pixel portion 904, a sound signal circuit 905, and an FPC 906 that are formed over the TFT substrate 907. The sound signal circuit 905 for operating a speaker comprises a main amplifier 909, a preamplifier 910, and a rectifier circuit 911.

In the sound signal circuit 905, a small sound signal is externally inputted and amplified to operate a speaker. In the rectifier circuit 911, the inputted sound signal is rectified to detect the signal level. In this manner, the sound volume can be adjusted automatically, for example.

As described above, according to the invention, the rectifier circuit with a preferable frequency characteristic can be configured over an insulating substrate by using a TFT. Described above is the case where a sound signal is rectified, however, other signals can be rectified as well as the sound signal according to the invention and a sensor and the like can be structured.

Embodiment 5

The semiconductor device of the invention configured as described hereinbefore is applicable to various kinds of electronic apparatus. Such electronic apparatuses using the semiconductor device of the invention are illustrated hereinafter.

Such electronic apparatuses include a video camera, a digital camera, a head mounted display (goggle-type display), a game machine, a car navigation system, a personal computer, a portable information terminal (mobile computer, mobile phone, electronic book, etc), a television, and the like.

Figure 7A:
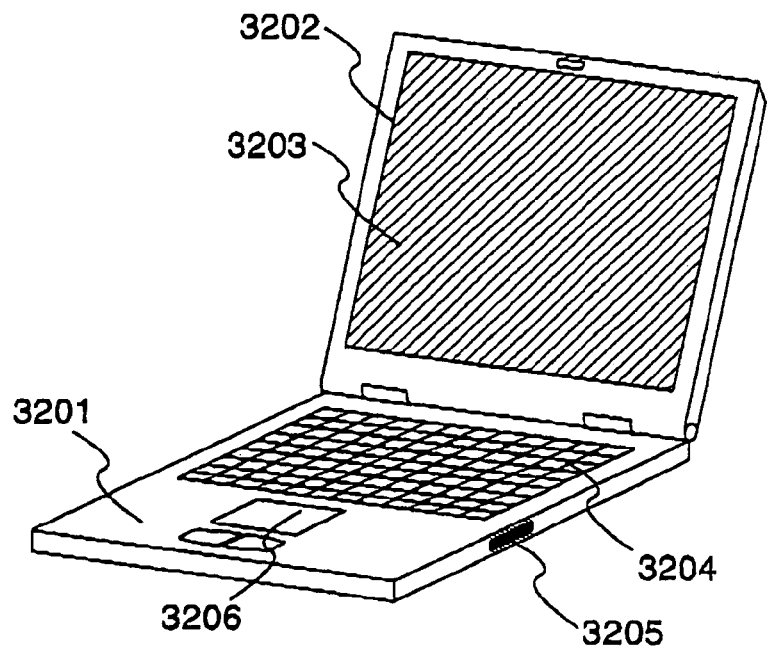
FIGS. 7A and 7B are views of electronic apparatuses applying the semiconductor device of the invention.

FIG. 7A illustrates a laptop personal computer including a body 3201, a housing 3202, a display portion 3203, a keyboard 3204, an external connection port 3205, a pointing mouse 3206, and the like. The semiconductor device of the invention can be applied to the display portion 3203 and the like. The semiconductor device having the rectifier circuit of the invention can be structured a more systematic electronic apparatus.

Figure 7B:
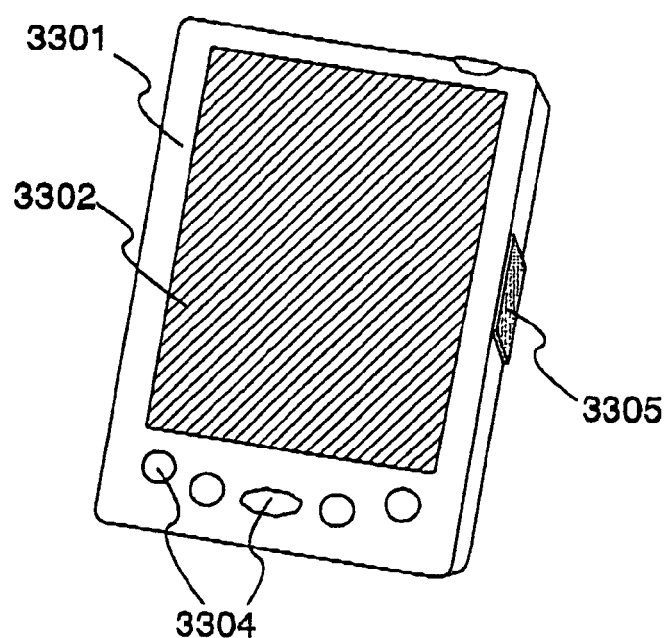

FIG. 7B illustrates a portable information terminal including a body 3301, a display portion 3302, operating keys 3304, an infrared port 3305, and the like. The semiconductor device of the invention can be applied to the display portion 3302 and the like. The semiconductor device having the rectifier circuit of the invention can be structured a more systematic electronic apparatus.

The applicable range of the invention is so wide that it can be applied to electronic apparatuses in every field in addition to the laptop personal computer and the portable information terminal. The electronic apparatuses in this embodiment can be realized by any configuration using Embodiment Modes 1 and 2 and Embodiments 1 to 3.

This application is based on Japanese Patent Application serial No. 2003-310767 filed in Japan Patent Office on 2, Sep., 2003, the contents of which are hereby incorporated by reference.

Although the invention has been fully described by way of Embodiment Modes and with reference to the accompanying drawings, it is to be understood that various changes and modifications will be apparent to those skilled in the art. Therefore, unless such changes and modifications depart from the scope of the invention hereinbefore defined, they should be constructed as being included therein.

What is claimed is:

1. A semiconductor device comprising:
   a first substrate;
   a second substrate attached to the first substrate;
   a pixel portion formed over the first substrate; and
   a sound signal circuit comprising a rectifier circuit formed over the first substrate, wherein the pixel portion and the sound signal circuit are located between the first substrate and the second substrate, and wherein the rectifier circuit comprises a first input terminal to which a first signal is configured to be inputted, a second input terminal to which a second signal is configured to be inputted, a first amplifier circuit configured to compare the first signal and the second signal, a waveform shaping circuit configured to shape waveform of an outputted signal of the first amplifier circuit, a second amplifier circuit, and an analog switch which is configured to be controlled by a waveform shaped signal generated by the waveform shaping circuit and is configured to connect an input portion of the second amplifier circuit and the first input terminal or connect the input portion of the second amplifier circuit and the second input terminal.

2. The semiconductor device according to claim 1 further comprising:

a source signal line driver circuit formed over the first substrate; and a gate signal line driver circuit formed over the first substrate.

3. The semiconductor device according to claim 1, wherein the rectifier circuit is a half-wave rectifier circuit comprising a thin film transistor.

4. The semiconductor device according to claim 1, wherein the pixel portion comprises a thin film transistor.

5. The semiconductor device according to claim 1, wherein the first signal and the second signal are opposite phases to each other.

6. A semiconductor device comprising:

a first substrate;

a pixel portion formed over the first substrate; and a sound signal circuit comprising:

a rectifier circuit formed over the first substrate; and a main amplifier circuit formed over the first substrate, wherein the rectifier circuit comprises a first input terminal to which a first signal is configured to be inputted, a second input terminal to which a second signal is configured to be inputted, a first amplifier circuit configured to compare the first signal and the second signal, a waveform shaping circuit configured to shape waveform of an outputted signal of the first amplifier circuit, a second amplifier circuit, and an analog switch which is configured to be controlled by a waveform shaped signal generated by the waveform shaping circuit and is configured to connect an input portion of the second amplifier circuit and the first input terminal or connect the input portion of the second amplifier circuit and the second input terminal.

7. The semiconductor device according to claim 6 further comprising:

a source signal line driver circuit formed over the first substrate; and a gate signal line driver circuit formed over the first substrate.

8. The semiconductor device according to claim 6 further comprising a second substrate attached to the first substrate over the pixel portion.

9. The semiconductor device according to claim 6, wherein the rectifier circuit is a half-wave rectifier circuit comprising a thin film transistor.

10. The semiconductor device according to claim 6, wherein the pixel portion comprises a thin film transistor.

11. The semiconductor device according to claim 6, wherein the first signal and the second signal are opposite phases to each other.

12. A semiconductor device comprising:

a first substrate;

a pixel portion formed over the first substrate; and a sound signal circuit comprising:

a rectifier circuit formed over the first substrate;

a main amplifier circuit formed over the first substrate; and a preamplifier circuit formed over the first substrate, wherein the rectifier circuit comprises a first input terminal to which a first signal is configured to be inputted, a second input terminal to which a second signal is configured to be inputted, a first amplifier circuit configured to compare the first signal and the second signal, a waveform shaping circuit configured to shape waveform of an outputted signal of the first amplifier circuit, a second amplifier circuit, and an analog switch which is configured to be controlled by a waveform shaped signal generated by the waveform shaping circuit and is configured to connect an input portion of the second amplifier circuit and the first input terminal or connect the input portion of the second amplifier circuit and the second input terminal.

13. The semiconductor device according to claim 12 further comprising:

a source signal line driver circuit formed over the first substrate; and a gate signal line driver circuit formed over the first substrate.

14. The semiconductor device according to claim 12 further comprising a second substrate attached to the first substrate over the pixel portion.

15. The semiconductor device according to claim 12, wherein the rectifier circuit is a half-wave rectifier circuit comprising a thin film transistor.

16. The semiconductor device according to claim 12, wherein the pixel portion comprises a thin film transistor.

17. The semiconductor device according to claim 12, wherein the first signal and the second signal are opposite phases to each other.

* * * * *

UNITED STATES PATENT AND TRADEMARK OFFICE
CERTIFICATE OF CORRECTION

| | | Page 1 of 1 |
|---|---|---|
| PATENT NO. | : 8,416,220 B2 | |
| APPLICATION NO. | : 11/730086 | |
| DATED | : April 9, 2013 | |
| INVENTOR(S) | : Jun Koyama et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 921 days.

Signed and Sealed this
Third Day of March, 2015

Michelle K. Lee
*Deputy Director of the United States Patent and Trademark Office*